United States Patent
Correa Peña y Lillo et al.

(10) Patent No.: US 7,815,709 B2
(45) Date of Patent: Oct. 19, 2010

(54) ALKALINE ELECTRO-HYDROMETALLURGICAL PROCESS FOR ZN EXTRACTION FROM ELECTRIC ARC FURNACE DUST

(75) Inventors: Duberlis Correa Peña y Lillo, Santiago (CL); Ricardo Vega Viveros, Las Sophoras 65 Depto. 102, Block 17, Villa Portales, Estacion Central, Santiago (CL)

(73) Assignees: Tecnologias de Reciclaje S.A. (CL); Duberlis Correa Pena Y Lillo (CL); Ricardo Vega Viveros (CL)

(*) Notice: Subject to any disclaimer, the term of this patent is extended or adjusted under 35 U.S.C. 154(b) by 620 days.

(21) Appl. No.: 11/595,200

(22) Filed: Nov. 10, 2006

(65) Prior Publication Data
US 2008/0011123 A1    Jan. 17, 2008

(51) Int. Cl.
  C21B 15/00   (2006.01)
  C22B 15/00   (2006.01)
  C22B 19/20   (2006.01)
(52) U.S. Cl. .......................................... 75/714; 75/725
(58) Field of Classification Search .................. 75/330, 75/334, 363–374, 392, 414, 416, 419, 420, 75/431, 430, 10.3, 585, 654, 656, 710, 711, 75/724, 725, 743, 746, 961; 205/50, 67, 205/74, 369, 516, 581, 603–608; 423/22, 423/99, 101, 102, 109, 658.5; 252/184; 204/216
See application file for complete search history.

(56) References Cited

U.S. PATENT DOCUMENTS 2,655,472 A * 10/1953 Hilliard et al. .............. 205/604
3,326,783 A    6/1967 Winter
4,032,425 A * 6/1977 Kametani ................... 204/261
4,606,765 A * 8/1986 Ferlay ........................ 205/516
6,500,229 B1 * 12/2002 Roux et al. ................... 75/430
2007/0023358 A1 * 2/2007 Boyd et al. .................. 210/670

FOREIGN PATENT DOCUMENTS

FR    2 510 141 A1    1/1983
FR    2 757 540 A1    6/1998
FR    2 770 229 A1    4/1999

OTHER PUBLICATIONS

Webster's Third New International Dictionary, Unabridged. Definition of "bleed." Copyright 1993.*
Glossary of Metallurgical and Metalworking Terms. Metals Handbook. ASM Handbooks Online. ASM International, 2002.*
B. Mishra. Extractive Metallurgy: Hydrometallurgical Processes. ASM Handbooks Online. ASM International, 2002.*
Evaporators. Section 11: Heat-Transfer Equipment. Perry's Chemical Engineers' Handbook (7th edition). McGraw Hill, 1997.*

* cited by examiner

*Primary Examiner*—Scott Kastler
*Assistant Examiner*—Vanessa Velasquez
(74) *Attorney, Agent, or Firm*—DLA Piper LLP (US)

(57) ABSTRACT

An electro-hydrometallurgical process that extracts zinc from electric furnace dust (EAF dust) to produce zinc of high purity and fine particle size, including leaching EAF dust with an alkaline solution to form a zincates solution, separating the liquid and gangue in the zincate solution; inertizing the gangue, purifying the liquid by cementation and separating the liquid from precipitated solids; purifying the zincate solution obtained from the cementation by adsorption, at least partially evaporating the resulting pure solution, bleeding at least a fraction of the concentrated solution obtained; crystallizing at least a fraction of the concentrated solution, electro-depositing zinc from the concentrated solution; and separating washing and drying deposited Zn.

7 Claims, 2 Drawing Sheets

ALKALINE ELECTRO-HYDROMETALLURGICAL PROCESS FOR ZN EXTRACTION FROM ELECTRIC ARC FURNACE DUST

RELATED APPLICATION

This application claims priority of Chilean Patent Application No. 1824-2006, filed Jul. 12, 2006, herein incorporated by reference.

TECHNICAL FIELD

This disclosure relates to electro-hydrometallurgical processes, more particularly to a process for extracting zinc from electric furnace dust (EAF dust).

BACKGROUND

Electric steelworks mainly use pressed scrap, sheets, galvanized elements and the like, which contain heavy metals such as Zn, Pb and Cd, which evaporate at a high temperature to which these furnaces operate (1600° C.), then condense as oxides when the smoke gets cold and are captured in sleeve filters. This dust is very fine and difficult to handle, its average chemical composition is shown in Table 1, where a 20-21% of Zn, 20-35% of Fe, 3 to 5% of Pb, 3% of chlorides, etc. are highlighted. Cd presence is only recorded in no more than 800 ppm.

TABLE 1

Average Composition of steelworks dust (EAF dust), % p/p

| Element | Chile | USA | France | Spain |
|---|---|---|---|---|
| Fe | 34.4 | 28.5 | 21.8 | 25.9 |
| Zn | 20.0 | 19.0 | 21.2 | 18.6 |
| Pb | 4.68 | 2.1 | 3.6 | 3.63 |
| Cd | 0.076 | <0.01 | ND | 0.10 |
| Cr | 0.2 | 0.39 | 0.37 | 0.31 |
| As | 0.01-0.03 | ND | ND | ND |
| Ca | 1.91 | 1.85-10.0 | 12.8 | 3.50 |
| Ni | 0.017 | 0.01-0.02 | 0.1 | 0-0.7 |
| Mo | <0.01 | <0.02 | ND | ND |
| Mn | 1.83 | 0.08 | 2.5 | 2.81 |
| Mg | 0.71 | 2.46-4.60 | ND | 1.53 |
| Cu | 0.2-03 | 0.77-2.93 | 0.25 | 0.54 |
| Si | 1.5 | 0.6-2.32 | ND | 1.65 |
| Cl | 3.5 | 1.35-2.49 | 1.75 | 3.43 |
| F | — | 0.51-2.36 | ND | ND |
| K | 2 | 0.01-0.88 | 2.06 | 1.23 |
| Na | 1.37 | 0.06-1.12 | 2.23 | 1.27 |
| Al | 0.27 | 0.29-2.31 | ND | 0.44 |
| S | 1.08 | ND | ND | ND |

Refs. (4, 5)

When the Zinc content in the dust is at a level of 20 to 21%, it happens that a 20 to 30% of the same is found in the form of zinc ferrite, $ZnFe_2O_4$, that dissimilar to zinc oxide, ZnO, is hardly soluble in hydro-metallurgic treatments, both in acid and alkaline media, to which it is subjected to retrieve zinc.

Environmental regulation from almost any country in the World, which is increasingly rigorous, classifies the electric steelwork dust as a hazardous waste due to its content of heavy metals, which means that the waste can not be disposed without a previous treatment (5). On the other hand, the feasibility of recycling this dust to the same steelwork which produces it, to retrieve the iron it contains (25-35%), is difficult due to operational problems it causes because of the fineness of the dust and the presence of the above-mentioned contaminants. The hazardous character of steelworks dust is because of the presence of Pb, Cd and hexavalent Cr, which is measured by the Environmental Protection Agency of USA EPA SW-846 test, Method-1131 "TCLP—Toxicity Characteristic Leaching Procedure" (7,8). Table 2 shows lixiviation limits which wastes must meet.

TABLE 2

Lixiviation limits (ppm) for EAF dust

| | Pb | Cd | Cr | As | Ag | Ba | Hg | Se | U |
|---|---|---|---|---|---|---|---|---|---|
| US EPA | 5 | 1 | 5 | 5 | 5 | ND | 0.2 | 1 | ND |
| Canada | 0.5 | 0.5 | 0.5 | 0.5 | 0.5 | 50 | 0.01 | 0.1 | 200 |
| Italy | 0.2 | 0.02 | 2 | 0.5 | 0.5 | ND | ND | ND | ND |
| Germany | 2.0 | 0.5 | 10.0 | 1 | ND | ND | ND | ND | ND |

Refs. (7, 8 and 9)

In Chile and in most of Latin American countries, the above regulation is applied. Recently, environmental regulations have progressed around the world, for example, in the USA since 1988, the EPA has classified steelworks dust as dangerous (10) and in 1995 it was established that treatment technologies must comply with the TCLP test for 14 elements (11). Table 3 shows typical TCLP analysis for Chilean steelworks dusts, where it is observed that the national regulation for Cd is exceeded.

TABLE 3

Typical results of TCLP Test for Chilean steelwork dusts, mg/L

| Sample | P | Cd | Cr | A | Ag | B | Hg | Se |
|---|---|---|---|---|---|---|---|---|
| 1 | 0.5 | 4.0 | 0.05 | <0.001 | <0.02 | 0.4 | <0.001 | 0.10 |
| 2 | 1.8 | 24.6 | <0.03 | <0.001 | <0.01 | 0.5 | <0.001 | 0.14 |
| Norm | 5 | 1 | 5 | 5 | 5 | 100 | 0.2 | 1 |

Consequently, environmental considerations are key in the research and development of technologies to process this type of wastes. Thus, the strategy to follow should recover the valuable metals (Fe, Zn, Pb) and generate a no hazardous waste that can be stored without problems, or otherwise valorized through some other use.

Environmental considerations mean that the industrial processes to be applied should meet the environmental regulations established by each country, which are translated in rules and regulations expressed in the accomplishment of certain environmental standards regarding the quality of the air, emission of particulate matter and disposition of liquid and solid wastes.

For recycling, a number of processes are available nowadays. In the first place are the pyre-metallurgical processes represented by the Waelz process (12), which is the main technology in use of those called High Temperature Metal Recovery (HTMR). It is a robust and well established technology, having the following features:

1) It operates at high temperatures and makes an intensive use of energy.
2) Minimum economic size is of over 50,000 tons/year (13), which necessarily has led to set up regional plants in USA since the average dust generation in steelworks (EAF dust) is about 8,000 tons/year per plant (10). This faces the governmental pressure of restraining transportation of hazardous materials.

3) It generates low value products which require a hydro-metallurgical treatment (washing) to be valorized.
4) It produces an inert slag which is used in roadways stabilization.
5) It releases important volumes of combustion gases into the atmosphere.

Several other HTMR (10) technologies have been oriented to solve problems of the Waelz process, like installing small plants, processing dusts without having to agglomerate them, recycling iron and producing a no hazardous waste. Nevertheless, almost all of these processes also make an intensive use of energy and present problems in the condensation of volatile matter (Pb, Zn, Cd and salts as chlorides), reasons why many of them have been abandoned.

Hydro-metallurgical technologies are less developed, existing plants at pilot level or at small commercial scale. These technologies are becoming important due to the following reasons (14):
1) They provide environmental benefits as they do not generate air pollution.
2) They make possible the installation of much smaller plants, which in comparative terms need less investment and lower operational costs.
3) They have the ability to produce higher added value products (pure metals).
4) They have the ability to easily separate halures and provide an easy disposition of dumping.
5) They generate a solid recyclable to the EAF or HTMR.

Problems still seeking solutions are the following (14, 5):
1) Low Zinc recovery because the Zn contained in the ferrite can not be dissolved in virtually any of the lixiviation media used, including mineral acids and strong basis.
2) Separation of metal is expensive.
3) The solid waste from the lixiviation stage it is not inert, what makes expensive its landfill dumping and also limits its applications.

Research works are being performed with the process in alkaline media due to its advantages, especially, in front of the process in acid media (15). Advantages are:
1) Separation of iron in the lixiviation stage, since iron oxides are not soluble in alkaline media (16), different from zinc, lead and cadmium oxides, which are quickly dissolved. In acid media, an important amount of iron is dissolved, economically complicating its separation stages and its final disposition.
2) It produces a higher added value product (high quality zinc powder).
3) It is more favorable because of better handling and minimization of wastes (15).

Improvements investigated in the alkaline process are referred to the release of zinc from the ferrite by fusion with soda and later lixiviation, with a recovery of a 95% (17) and lixiviation with soda through micro-waves (4), thus increasing zinc recovery in 5 to 10% in relation to the conventional system.

In short, from the point of view of environmental sustainability, hydro-metallurgical processes are better than the pyre-metallurgical ones, and within the hydro-metallurgical processes, the alkaline process has clear advantages over the acid media process, that is why then the importance this process is having nowadays, in spite of the fact that up to date no successful industrial realizations are known.

The first and main patents that formalize the alkaline hydro-metallurgical process (REZEDA procedure) are U.S. Pat. No. 3,326,783 and FR 2,510,141. The former is applied to the calcine coming from toasting of oxidized zinc minerals and the latter is applied to electric steelworks dusts.

In the 1970's, Amax Co. of New Jersey, USA, operated a pilot plant based on the alkaline process. Development of the same was abandoned due to technical and economic problems. An industrial plant was built years later in France, also on the basis of the alkaline process, and it was also abandoned.

Improvements tried to economically solve the elimination of chlorides and sulfates present in the steelworks dusts, whose concentration levels are limited by restrictions imposed in the electro-deposition stage.

Below, and in order to have a better understanding of the background, it is described the basic process (REZEDA procedure) and, afterwards, the improvements incorporated by others.

The basic hydro-metallurgical process in alkaline media, described in the above patents, includes a lixiviation stage of steelworks dust in soda solution, followed by filtration in which the solid waste with high iron content is separated after washing. Filtrate is purified through cementation with zinc powder, precipitating lead, cadmium, copper and other heavy metals, which are separated by filtration. Filtrate then goes to an electro-deposition stage, where the zinc powder is deposited and then filtered, washed and dried to obtain the dry powder. The stripped solution from the electro-deposition stage is recirculated to the lixiviation stage, previous elimination of saline impurities by evaporation. The stripped solution recirculating in a closed circuit is progressively enriched in saline impurities, specifically chlorides and sulfates which are added by the feeding of steelworks dusts to be treated, like soda and water, among others. These impurities must be eliminated since a determined concentration level of them must be maintained in the electrowinning stage. These saline impurities are eliminated like brine obtained through evaporation of part of the recirculating solution.

U.S. Pat. No. 3,326,783 does not provide information on the quality of the zinc powder obtained, or the waste disposition, neither as how saline impurities and washing waters are disposed of, important things in the economy of the process, which is explained because, by that time, environmental regulations were rather elemental.

FR 2,510,141 provides more precise details on the lixiviation, cementation and electrowinning stages. It claims a two stage lixiviation to make soluble the zinc present in both oxides and ferrites. Nevertheless, it indicates that just lixiviation of oxides is affordable and proposes the evaporation stage to eliminate salts. Regarding lixiviation waste, it only indicates that this is sterile, without presenting evidence or mentioning how it is disposed of. Regarding the quality of the zinc powder obtained, it only refers to the particle size distribution, wherein 82% is between 200 and 325 micron. It does not mention the impurities it contains or its metallic content, which impacts the profitability of the process.

FR 2,757,540 proposes to submit steelworks dust to a lixiviation process with aqueous bleach to eliminate chlorides and sulfates by dissolution and then subjecting the washed waste thus obtained to an alkaline lixiviation, cementation of the resulting alkaline solution and electrowinning of Zn from it to, finally, recirculate the stripped solution directly to the lixiviation step. On the other side, a fraction of near 70% of the washing water, charged with chlorides and sulfates, is recirculated to the washing stage with bleach, while the rest is submitted to a partial neutralization with acid to precipitate mainly lead hydroxide, which is sent to the alkaline lixiviation together with the wet waste produced by washing with bleach. The filtrate is treated in an evaporator to separate brine and water which is returned to the process. An analysis is as follows:

1) The desalinization pre-treatment of steelworks dusts consists of a process line (L1) autonomous and independent from a line (L2) of alkaline treatment itself, only tied because the latter is fed with both wet waste and precipitated hydroxides generated by the former, thus losing the degree of separation they already had.

2) The washing waters treated in the evaporator are only those generated in L1. Nevertheless, in L2 the following situation is present: the wet waste fed to this line carries a content of chlorides not over 0.03% (18) and a moisture content estimated between 10 and 30%, a level that depends on the kind of solid-liquid separation employed. Since the process line operates with a lixiviating solution in a closed circuit, there will be a cumulative effect of salts and water. The salt content is limited by the concentration imposed in the electrowinning stage and, in the same manner, the water content is limited by the soda concentration in the recirculating solution which should be kept around 300 to 400 g/L. On the other hand, in addition, it must considered that the washing waters of the different filtration stages in the process line get soda and zincate which must be recovered, making it necessary to have continuous or periodic purges and treat the washing waters in an evaporator. Nevertheless, the process recirculates to the leaching stage only a fraction of the solution that comes out of electrowinning, and neutralizes the rest with external acid spills coming from operations of galvanization. The end result is that the evaporation is eliminated, but soda is lost and liquid wastes are generated.

Finally, FR 2,770,229 refers to conditioning of zinc powder obtained by electrowinning in an alkaline medium. Basically, the pulp containing zinc powder from electrowinning is filtered in an inert atmosphere. Washing of the Zn cake soaked in zincate solution is performed in demineralized and deoxygenated water, drying the Zn powder under vacuum (65 mm of Hg) at low temperature (20-30° C.). These operations are performed with just one equipment. It sets forth the use of ultrasound to accelerate the washing operation or to improve a quicker segregation of the powder. Zinc obtained is claimed to have a total zinc content of 99.6%, out of which 97-98% is metallic zinc and 2 to 3% is zinc oxide, and exhibits a particle size on the order of 6 microns.

The traditional processes described in all the above analyzed patents use conventional electrodeposition cells of rectangular design, whose surface is open to the atmosphere, amenable to alkaline fog formation and dissemination due to the rupture of hydrogen and oxygen bubbles. In addition, its hydrodynamics causes the production of Zn in the form of flakes which tend to adhere to the cathode surfaces, thus making necessary the use of complex vibration or sweeping systems.

SUMMARY

This disclosure relates to an electro-hydrometallurgical process that extracts zinc from electric furnace dust (EAF dust) to produce zinc of high purity and fine particle size, including leaching EAF dust with an alkaline solution to form a zincates solution, separating liquid and gangue in the zincate solution; inertizing the gangue, purifying the liquid by cementation and separating the liquid from precipitated solids; purifying the zincate solution obtained from the cementation by adsorption; at least partially evaporating the resulting pure solution, bleeding at least a fraction of the concentrated solution obtained; and crystallizing at least a fraction of the concentrated solution, electro-depositing zinc from the concentrated solution; separating, washing and drying deposited Zn.

This disclosure also relates to a system for drying washed zinc cake produced according to the electro-hydrometallurgical process, including a substantially cylindrical body having an interior space provided with a rotary worm screw, arranged axially in the interior space and driven externally by a motor; an inclination mechanism; a condenser connected to an upper portion of one portion of the body end, an inner cooling coil and an exit through a water seal; a blower following the condenser and connected to an upper portion of another end portion of the cylinder; a hopper that includes a worm screw driven by an external motor, connected to the cylinder through a rotary valve proximate to the connection of the condenser; a rotary valve located in lower portion of the cylinder, in an end portion opposed to one end portion of the hopper; an external heating system; and a nozzle for nitrogen injection.

This disclosure further relates to a system for cooling the zinc powder, produced according to the electro-hydrometallurgical process, including a substantially cylindrical body having an interior space; a rotary worm screw arranged axially in the interior space and driven externally by a motor; a tilting mechanism; a rotary valve in an upper part of one of an end portion of the body and another valve in a lower portion of an opposite end of the cylinder; an external cooling system utilizing a cooling fluid; and a nozzle for nitrogen injection.

This disclosure still further relates to a system for leaching and cementation according to the electro-hydrometallurgical process, including a closed reactor, implemented with a stirrer and an indirect system of heating; and a lid provided with a condenser followed by an extractor and a ventilation duct, a device that maintains a small negative pressure inside the reactor, thus avoiding leaks of alkaline fog from the reactor.

This disclosure further also relates to Zn powder of high purity and fine particle size obtained by the electro-hydrometallurgical process.

DETAILED DESCRIPTION

Figure 1:
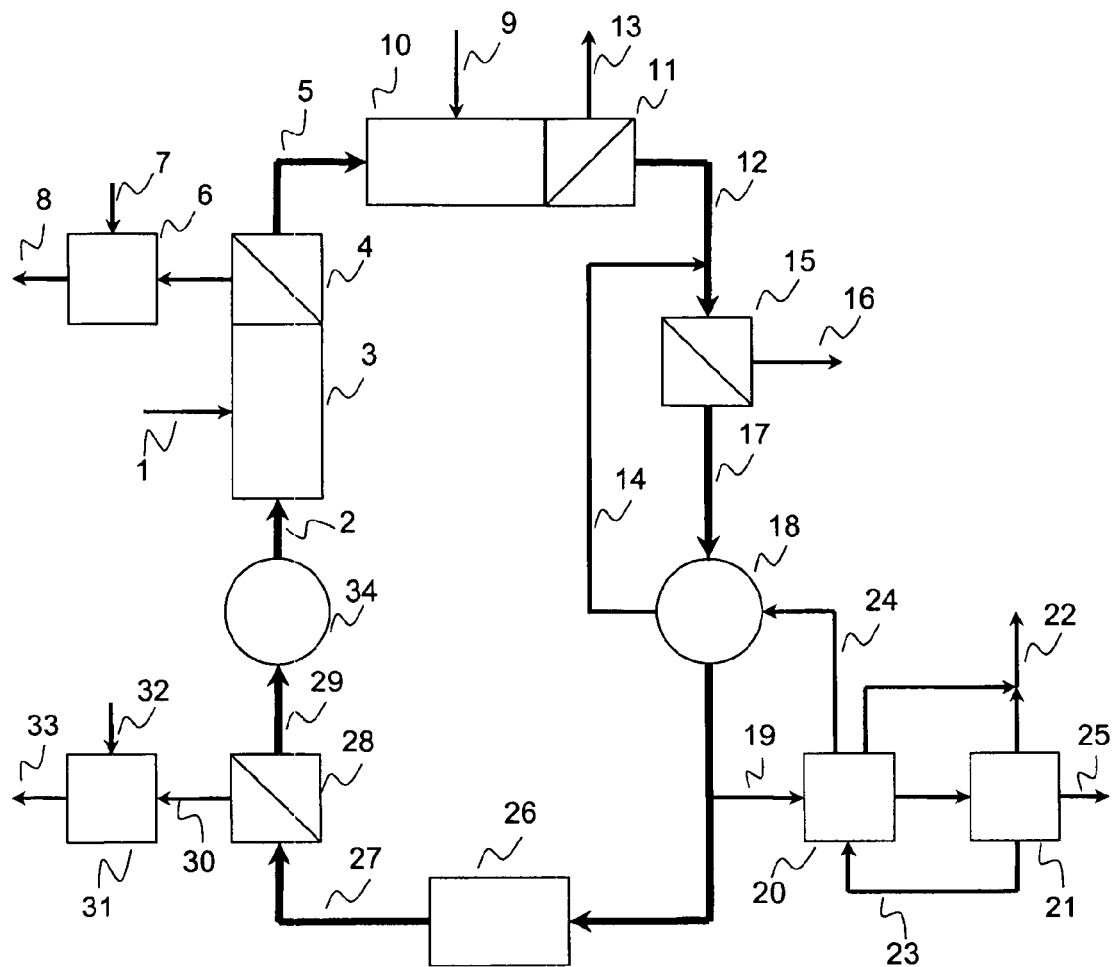
FIG. 1 is a schematic flow diagram of an electro-hydrometallurgical process.

It will be appreciated that the following description is intended to refer to specific embodiments of the invention selected for illustration in the drawings and is not intended to define or limit the invention, other than in the appended claims.

We provide processes that enable production of zinc powder of high purity and fine particle size as from EAF dust, that avoid generation of liquid wastes and minimize particulate and gaseous emissions, thus contributing to make the process environmentally sustainable by reducing pollution at levels lower than those demanded by regulations and that, in addition, reduce water and alkali consumption and make the gangue to become inert, valuing them as building material or material to be recycled in steelworks, thus supporting the cost-effectiveness of the project:

a) Inertization and valuation of waste from where zinc has been extracted, so as it becomes a by-product for building industry, or a material that can be recycled in steelworks furnaces.

b) Elimination of arsenic from liquid streams through an operation of adsorption with chemical reaction, in crosscurrent stages, done by percolating the solution on a fixed bed of $Ba(OH)_2$.

c) Purification of the lixiviation solution by means of fractional crystallization by evaporation, maintaining its concentration of impurities, such as chlorides, sulfates and others, at a certain level required by electrowinning.

d) Use of operational practices that reduce the emission of particulate matter, both inside and outside of the processing building, especially during transportation of dusts.

e) Use of operating equipment specially designed to eliminate or at least to reduce gaseous emissions (alkaline fog) inside the processing building and minimize those discharged outside, in the lixiviation and cementation operations.

f) Use of a no conventional electrowinning cell to obtain zinc powder of high purity and fine particle size, without polluting emissions (alkaline fog).

g) Reduction of water consumption by performing all solids washings in crosscurrent or countercurrent stages and segregating solutions in such a way that those of low concentration are recycled to the washing operations, and those more concentrated are evaporated to retrieve water and re-concentrate soda, thus eliminating generation of liquid wastes ("dry plant").

h) Use of optimal operational practices and conditions for washing of zinc powder, in crosscurrent or countercurrent stages.

i) Use of specially designed equipment both for drying and cooling of Zn powder, that allows for high purity.

For a better explanation of the disclosure, we provide a description of an example, in relation to FIG. 1, which shows one generic scheme of a process.

As it is seen in FIG. 1, EAF dust 1 is fed, together with an alkaline solution 2, to a lixiviation reactor 3. The resulting suspension is taken to a solid-liquid separator 4, out of which a zincates solution 5 is obtained (mainly of Pb and Zn) and a wet solid (or gangue) 6. This latter is treated with an inertizing mixture 7 to be then spread in a drying court, removing it as an inert by-product 8 after a curing period. Zincates solution 5 is purified with Zn powder 9 in a cementation reactor 10. The resulting suspension is taken into a solid-liquid separator 11, from which a solution, mainly of zincate 12 and a Pb paste 13 are obtained. The zincate solution 12 is mixed with a recirculated zincate solution 14 for further purification by adsorption in a chemical reaction on a bed of $Ba(OH)_2$ 15, which is carried out by percolation in crosscurrent stages. Once the bed 15 is saturated, it is discarded 16 and replaced by a fresh one. The solution 17 free of arsenic is stored in a tank 18, from which a fraction of it 19 is constantly extracted to condition both its humidity content and its salts content in an evaporator 20 followed by a crystallizer 21. Steam 22 removed from both units is condensed and recycled as process water, retrieving thermal energy in the operation. Likewise, concentrated solutions of zincate 23 and 24 are recirculated into the crystallizer 21 and the evaporator 20, respectively, while salts produced in the crystallizer 21 are disposed as solid waste 25. In this way, in the tank 18, there is permanently kept a pure solution rich in zincate which continuously feed the electrowinning circuit 26, from where a pulp 27 of finely divided zinc suspended in zincate solution is obtained. This pulp is passed through a solid-liquid separator 28, from which there is obtained both a solution 29, being pure and depleted in zincate, which is stored in the tank 34, and a cake 30 of Zn soaked in zincate that, after being washed, dried in the dryer 31 under inert atmosphere 32, and cooled, becomes the main product of the plant, a Zn powder 33 of high purity and fine particle size.

To simplify the handling of powders and to avoid the emission of particulate material, as much inside as outside the processing building, the moisture content of EAF dust is set between about 5 and about 10%, preferably about 8%, which is kept at this value during transportation from the supplier source, as well as during its later storage and internal handling in the plant. To accomplish this, sensors and sprinklers must be implemented in stockpile equipment and transport vehicles.

According to the base process, extraction of zinc from EAF dust is performed in lixiviation reactor 3, mixing it with a recirculated alkaline solution, pure and stripped in zincate, with a zinc content below about 10%, with about 20% to about 50% of alkali, preferably NaOH, in a ratio of dust to solution between about 1:3 and about 1:5, preferably about 1:7, at a temperature between about 70 and about 120° C., preferably at about 90° C., under mechanical stirring between about 50 to about 150 rpm, preferably about 120 rpm, over about 30 to about 240 minutes, preferably 60 minutes.

The reactor should be of substantially air-tight design to avoid emanations of alkaline fog both in and out of the processing building, it must include a mixer and an external heating system, and whose lid is provided with a condenser followed by an extractor and a ventilation duct that discharges outside the processing building. A negative pressure is kept in its interior, between about 30 and about 60 mm of Hg, by a blower that passes the vapors through a condenser before discharging them to the atmosphere. In addition, the same type of equipment and operational practice should be used in cementation.

Suspension resulting from lixiviation is taken to a solid-liquid separator 4 which, depending on the production scale, can be a filter press, a band filter, a centrifuge, or a system including in addition decanters and/or thickeners, being able to do the washing of the cake in the same equipment, or separately. The same is valid for the other operations of solid-liquid separation of the process (equipment 11, 15 and 28).

The cake washing operation, in whichever separator, should be performed in stages, preferably countercurrent or crosscurrent. For example, the moist cake from lixiviation (moist gangue, imbibed in zincates) is washed with several successive loads, the first ones being of a soda solution, and the later of water. The use of soda in the first loads is imperative since it avoids precipitation of $Zn(OH)_2$, wherein zinc is lost when it is retained in the gangue cake. The number of loads, the volume to be used in each of them, and their soda concentration, will mainly depend on the soda concentration of the lixiviation solution and on the percentage of suspended gangue. For instance, if a filter press is used to filter a pulp of 8% suspended solids in soda 32%, when using volumes of washing loads equal to one volume of cake in each washing, from 6 to 10 loads are required to reduce the soda content in the cake to insignificant levels, wherein the first 2 to 3 loads are of a soda solution and last ones of water. This practice can reduce more than 10 times the washing water consumption with respect to the washing operation by continuous water injection to the filter.

Importantly, the processes and systems of the disclosure can further comprise washing of solids soaked in zincates (e.g., moist cake from lixiviation), in one or more stages, in a counter current or cross current operations, with between about three and about ten successive washing loads, wherein the first 2 to 5 washing loads comprise a solution of about 200 to about 400 g/L of NaOH and the last washing loads comprise water and the washing load volume is on the order of about one to three volumes of the volume of the solids to wash.

On the other hand, by segregating washing waters to ones of low concentration, for example, of up to about 5%, are recycled and the more concentrated ones are evaporated to retrieve water and re-concentrate soda, water consumption is optimized and generation of liquid waste is eliminated, thus transforming the premises in a "dry plant." The solution used in the leaching has 32% of soda water and is recirculated in a closed circuit, with a make up of fresh solution only for replacement of minor losses. Because of this, any amount of water that is added to that main stream is substantially eliminated to restitute the concentration of the soda solution at its original level.

The gangue, washed and moist and constituted mainly of Fe, is treated with an inertization mixture, consisting of a $SiO_2$ source (puzzolane, bentonite or silica gel), between about 0.02 and about 0.5% of the dry gangue, $Ca(H_2PO_4)_4H_2O$ between about 0.5 and about 3%, and $Ca(OH)_2$ between about 0.2 and about 0.8%. These components are added to the moist gangue cake so that the mass maintains a humidity content of between about 15 and about 25%, preferably about 20%. Mass is mixed. in an equipment of the cement mixer type until reaching substantial homogeneity. Gangue obtained in this way, after a curing period of about 3 to about 10 days, and being dried until the moisture content reaches between about 6 and about 12%, preferably about 10%, is inert according to the environmental regulation EPA SW-846 Method TCLP-1311, being typical results about 0.15 mg/L of Cd and about 0.28 mg/L of Pb, when the maximum limits of norm EPA are 1 and 5 mg/L, respectively, as it is observed in Table 2, This innocuous gangue approximately constitutes 63% of the original mass of the EAF dust and can be valorized, among other ways, as filling or construction material, in the manufacture of refractory bricks, heat accumulating bricks or pigments, or recycled to the electrical furnaces.

Zincates solution 5, to which it is convenient to incorporate the more concentrated washing waters, is purified in a cementation reactor 10 with Zn powder 9, added in a proportion of about 2% to about 12% in excess of the stoichiometric ratio (preferably about 8%) to reduce metals found under the zinc in the tension scale. The reactor operates at a temperature between about 70 and about 120° C., preferably about 80° C., under mechanical stirring between about 50 and about 100 rpm, preferably about 80 rpm, over about 30 to about 180 minutes, preferably about 60 minutes. The resulting suspension is taken to a solid-liquid separator 11, from which there is obtained a pure zincate solution 12 and a paste, mainly of Pb 13.

Preferably following cementation, there is an arsenic removal operation since it is continuously concentrated in liquid streams, in spite of its low content in the EAF dust, becoming a risk for the operators' health and eventually exceeding the permissible limit in electrowinning (0.002 g/L).

Elimination of arsenic is performed by adsorption with chemical reaction on solid $Ba(OH)_2$, according to the following stoichiometry (19):

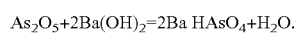

$$As_2O_5+2Ba(OH)_2=2Ba\ HAsO_4+H_2O.$$

In practice, it is convenient to carry out the operation in countercurrent or crosscurrent stages, percolating the cemented solution on a fixed bed of $Ba(OH)_2$. This bed should be operated with a load of $Ba(OH)_2$ between about 3 and about 10, preferably about 5 times over the stoichiometric amount required for each cementator batch, for security reasons. As an example, if 1000 L of solution of 32% soda and 0.023 gpL of As, that is to say, containing 0.023 kg of As, it would be required 0.0487 kg of $Ba(OH)_2$ to remove it according to stoichiometry and, operating at 5 times that amount, 0.244 kg are needed. The percolator runs 24 hours a day, purifying the stock solution of pure and rich zincate solution 18, and the recirculation flow 14 can be used to increase the retention time significantly, allowing flexibility to deal with eventual increases of As concentration. Temperature for the stock solution is kept between about 30 and about 90, preferably about 35° C.

The alkaline solution thus purified is submitted to electrowinning in a cylindrical cell of the EMEW type, from Electrometals Technologies Ltd., for example, whose airtight design allows confining the gases generated there and washing them prior to their evacuation, thus avoiding the emission of alkaline fog to the processing building and evacuating to the atmosphere a mixture of approximately 70% oxygen and 30% hydrogen. Typically, it is possible to obtain Zn of fine particle size, less than about 100 microns and with a 50% less than about 40 microns, which is separated and washed in a solid-liquid separation equipment. Nevertheless, by handling the operating conditions of this cell, as the solution flow through it, its soda concentration, and the current density, it is possible to regulate the zinc particle size. Unlike this process, the traditional processes use electro deposition cells of rectangular design, whose surface is open to the atmosphere, amenable to alkaline fog formation and dissemination, and produces Zn in the form of flakes instead of powder.

We now refer to the design of a special drying equipment 31 for the Zn powder, and to the use of operational practices and conditions which are the optimum for the solid-liquid separation 28 and the washing of Zinc powder, which have to be performed in countercurrent or crosscurrent stages, in similar conditions to those mentioned above since, in this way, a Zn of high purity can be reached. In this case, washing with water is not convenient because it will induce decomposition of the zincate and consequent precipitation of Zinc oxide, which would be retained in the humid zinc cake, contaminating it. Once the alkali concentration in the cake is reduced to marginal levels by means of washing loads of soda solution, it is possible to finish washing with water, thus minimizing the presence of zinc oxide in the final product.

Figure 2:
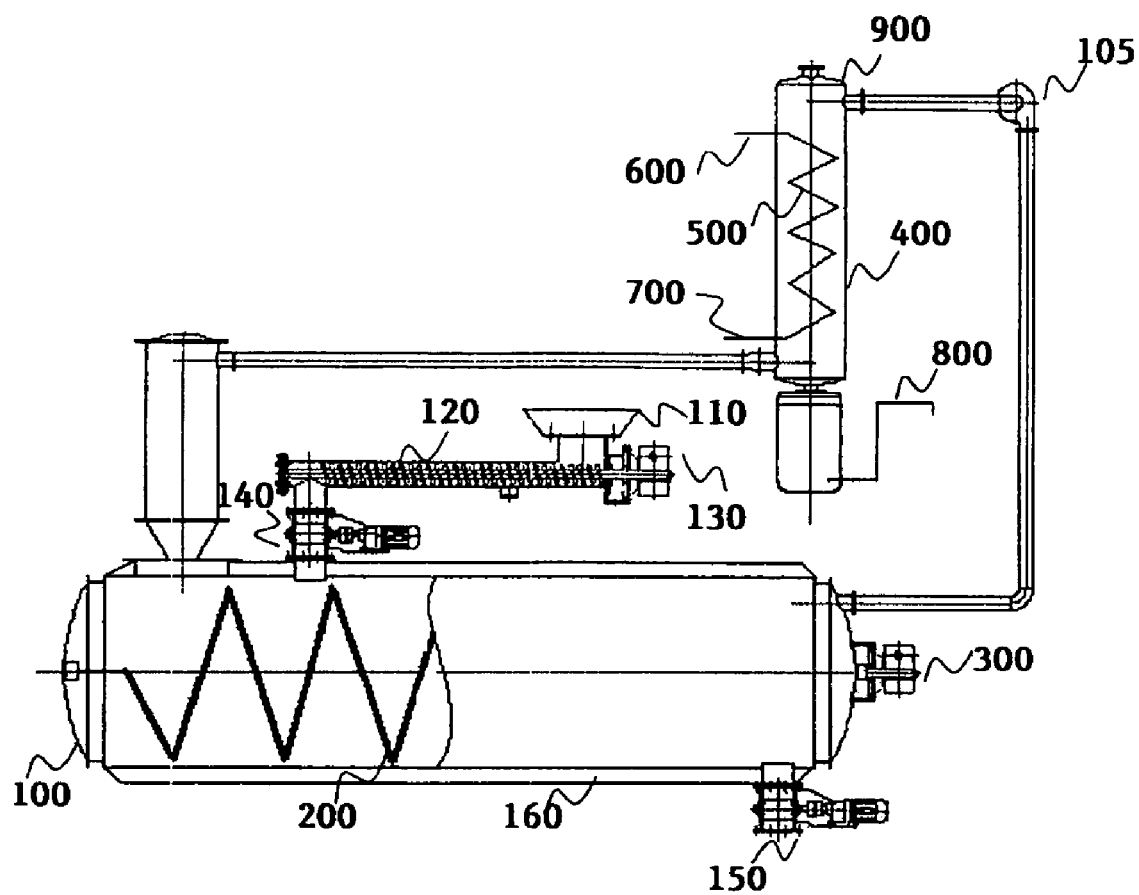
FIG. 2 is a schematic diagram of drying equipment used in the process of FIG. 1.

Next, there is a description of one example of drying equipment 31 (in FIG. 1), in relation to FIG. 2, which shows a generic scheme of the equipment. The drying chamber 100 is a substantially cylindrical, static design, equipped with the following elements: a rotary worm screw 200 arranged axially in its interior, driven externally by a motor 300; a tilting mechanism; a condenser 400 connected to the upper part of one of its ends, that has an inner cooling coil 500 with inlet 600 and outlet 700 for cooling water, and an exit through a water seal 800 that allows substantially continuous elimination of the condensate while maintaining the inert atmosphere inside the dryer; an exit 900 of inert gases connected to a blower 105 that follows the condenser and it is connected to the upper part of the other end of the cylinder; a hopper 110 that includes a rotary worm screw 120 driven by an external motor 130, connected to the cylinder through a rotary valve 140 in the proximities of the connection of the condenser, provided with a nitrogen injection in its base for feeding the humid zinc cake with exclusion of air; a rotary valve 150 located in the lower part of the cylinder, in the end opposed to the one of the hopper, also provided with nitrogen injection to remove the dry powder; an external and indirect heating system 160, by means of electrical resistances, heating steam, oil or combustion gases; a nozzle for nitrogen injection. The dryer operates with a slight positive pressure of an inert gas in its interior, for example nitrogen, at temperatures between about 100 and about 400° C. After drying, the powder is cooled to room temperature and finally reduced in its particle size to less than about 6 microns and bagged, also under inert atmosphere.

For cooling of the powder, an equipment of the same characteristics of the dryer may be used, that is to say, of substantially cylindrical design, provided with the following elements: a rotary worm screw arranged axially in its interior, driven externally by a motor; a tilting mechanism; a rotary valve in the upper part of one of its ends and another one in the lower part of the opposed end of the cylinder; an external and indirect cooling system, by means of a cooling fluid; and a nozzle for nitrogen injection.

A crystallizer by evaporation is used, following the multi-effect evaporator, to get crystallized salts that are eliminated as purge. This operation purifies the lixiviating solution, keeping the concentration of impurities such as chlorides, sulfates and others, at a determined level required by electrowinning.

Below, results are provided for a typical pilot scale operation of the process on a processing base of 22 ton EAF/day. Table 4 shows the main inlet and outlet streams, from which it is possible to establish the percentage distribution of the main elements in the different product streams, shown in Table 5. In this last table it is observed, for example, that the arsenic which enters the process as part of the EAF, which in Chile is between 0.01 and 0.03% dry weight basis, is distributed in a 25% to the gangue, 73% is eliminated in the filter of Ba(OH)$_2$ and 0.15% goes away as polluting agent in the Zn powder.

TABLE 4

Main streams of a typical operation (22 ton EAF/day)

| N° | | ton/day | Zn | Cu | Pb | Fe | Al | Sb | As | S | Ba | Be | Bi | Cd |
|---|---|---|---|---|---|---|---|---|---|---|---|---|---|---|
| | | | | | | | Element, kg | | | | | | | |
| | In | | | | | | | | | | | | | |
| 1 | EAF dust | 22.034 | 3543.785 | 81.085 | 948.192 | 7484.181 | 108.701 | 3.401 | 3.033 | 188.023 | 6.169 | 0.011 | 0.742 | 8.512 |
| 9 | Zn powder for cementation | 0.882 | 881.311 | 0.044 | 0.044 | 0.089 | 0.000 | 0.000 | 0.002 | 0.000 | 0.000 | 0.000 | 0.004 | 0.044 |
| | Out | | | | | | | | | | | | | |
| 8 | Gangue with 10% moisture | 15.350 | 1222.650 | 78.747 | 86.576 | 7183.932 | 65.622 | 1.796 | 0.760 | 0.525 | 6.148 | 0.010 | 0.553 | 4.904 |
| 13 | Pb Cement with 5% moisture | 1.318 | 88.156 | 1.986 | 861.382 | 299.662 | 0.000 | 0.000 | 0.000 | 0.000 | 0.000 | 0.000 | 0.000 | 3.373 |
| 16 | Ba cake with As, 10% moisture | 0.031 | | | | | | | 2.215 | | | | | |
| 25 | Crystallized purge, 10% moisture | 3.031 | 0.000 | 0.000 | 0.000 | 0.000 | 42.961 | 1.546 | 0.050 | 186.911 | 0.000 | 0.000 | 0.010 | 0.000 |
| 33 | Zn powder with 1% moisture | 2.322 | 2321.135 | 0.117 | 0.117 | 0.234 | 0.001 | 0.001 | 0.005 | 0.000 | 0.000 | 0.000 | 0.012 | 0.117 |

| N° | | ton/day | Ca | Cl | Co | Cr | Sn | Sr | P | Mg | Mn | Hg | Mo | Ni |
|---|---|---|---|---|---|---|---|---|---|---|---|---|---|---|
| | | | | | | | Element, kg | | | | | | | |
| | In | | | | | | | | | | | | | |
| 1 | EAF dust | 22.034 | 492.825 | 947.46 | 0.389 | 44.288 | 12.890 | 0.749 | 39.661 | 195.367 | 380.452 | 0.472 | 2.269 | 4.524 |
| 9 | Zn powder for cementation | 0.882 | 0.000 | 0.000 | 0.000 | 0.000 | 0.004 | 0.004 | 0.004 | 0.000 | 0.000 | 0.004 | 0.004 | 0.000 |
| | Out | | | | | | | | | | | | | |
| 8 | Gangue with 10% moisture | 15.350 | 476.626 | 0.000 | 0.345 | 41.446 | 8.542 | 0.000 | 0.000 | 0.000 | 290.120 | 0.018 | 0.345 | 1.727 |
| 13 | Pb Cement with 5% moisture | 1.318 | 0.000 | 0.000 | 0.044 | 0.000 | 4.230 | 0.000 | 0.000 | 0.000 | 0.000 | 0.442 | 0.000 | 2.797 |
| 16 | Ba cake with As, 10% moisture | 0.031 | | | | | | | | | | | | |
| 25 | Crystallized purge, 10% moisture | 3.031 | 16.199 | 947.34 | 0.000 | 2.725 | 0.000 | 0.691 | 39.544 | 195.367 | 90.332 | 0.000 | 1.807 | 0.000 |
| 33 | Zn powder with 1% moisture | 2.322 | 0.000 | 0.000 | 0.000 | 0.000 | 0.012 | 0.012 | 0.012 | 0.000 | 0.000 | 0.012 | 0.012 | 0.000 |

Stream numbers refer to those of FIG. 1.

TABLE 5

Distribution of the elements in different streams and residues

| N° | | Zn | Cu | Pb | Fe | Al | Sb | As | S | Ba | Be | Bi | Cd |
|---|---|---|---|---|---|---|---|---|---|---|---|---|---|
| | | | | | | Distribution of element in the stream, % p/p | | | | | | | |
| 8 | Gangue with 10% moisture | 34.50 | 97.12 | 9.13 | 95.99 | 60.37 | 52.81 | 25.05 | 0.28 | 99.65 | 94.05 | 74.50 | 57.61 |
| 13 | Pb Cement with 5% moisture | 0.00 | 2.45 | 90.84 | 4.00 | 0.00 | 0.00 | 0.00 | 0.00 | 0.00 | 0.00 | 0.00 | 39.63 |
| 16 | Ba cake with As, 10% moisture | 0.00 | 0.00 | 0.00 | 0.00 | 0.00 | 0.00 | 73.02 | 0.00 | 0.00 | 0.00 | 0.00 | 0.00 |
| 25 | Crystallized purge, 10% moisture | 0.00 | 0.00 | 0.00 | 0.00 | 39.52 | 45.46 | 1.65 | 99.41 | 0.00 | 0.03 | 1.35 | 0.00 |
| 33 | Zn powder with 1% moisture | 65 | 0.14 | 0.01 | 0.00 | 0.00 | 0.03 | 0.15 | 0.00 | 0.00 | 0.21 | 1.58 | 1.37 |

| N° | | Ca | Cl | Co | Cr | Sn | Sr | P | Mg | Mn | Hg | Mo | Ni |
|---|---|---|---|---|---|---|---|---|---|---|---|---|---|
| | | | | | | Distribution of element in the stream, % p/p | | | | | | | |
| 8 | Gangue with 10% moisture | 96.71 | 0.00 | 88.73 | 93.58 | 66.27 | 0.00 | 0.00 | 0.00 | 76.26 | 3.81 | 15.22 | 38.17 |
| 13 | Pb Cement with 5% moisture | 0.00 | 0.00 | 11.27 | 0.00 | 32.82 | 0.00 | 0.00 | 0.00 | 0.00 | 93.71 | 0.00 | 61.83 |
| 16 | Ba cake with As, 10% moisture | 0.00 | 0.00 | 0.00 | 0.00 | 0.00 | 0.00 | 0.00 | 0.00 | 0.00 | 0.00 | 0.00 | 0.00 |
| 25 | Crystallized purge, 10% moisture | 3.29 | 99.99 | 0.00 | 6.15 | 0.00 | 92.17 | 99.70 | 100.00 | 23.74 | 0.00 | 79.61 | 0.00 |
| 33 | Zn powder with 1% moisture | 0.00 | 0.00 | 0.00 | 0.00 | 0.09 | 1.56 | 0.03 | 0.00 | 0.00 | 2.48 | 0.51 | 0.00 |

Stream numbers refer to those of FIG. 1.

The improvement described above, related to consumption and recycling of water, is outlined in the following. EAF dust is leached with a 32% soda solution in a mass proportion of "soda solution/EAF powder"=7 (equivalent to a pulp of 40.5% of suspended and dissolved solids). The lixiviating solution is prepared by adding to the recirculated solution, depleted in Zn, a small make up of soda solution. After leaching and separation of the gangue by filtration, the filtrate is cemented and the Pb cement separated. Thus, a purified solution is obtained, a small proportion of which is substantially continuously passed through the EMEW cell, where Zn is extracted in the form of powder, therefore being regenerated the 32% soda solution depleted in Zn that is recirculated.

The leaching operation takes place with a 32% soda solution, which constitutes the main stream of the plant. Therefore, water that is introduced to it should be removed. The removal of water takes place in a multi stage evaporator-crystallizer, and it is recovered as condensate in condensers that use cold water from a cooling tower. From the evaporator, a condensate and a 32% soda solution are obtained. Part of this solution is recirculated and the rest goes to the crystallizer from which are obtained a condensate, a suspension that is purged and a 32% soda solution that is recirculated. Thus, the plant does not generate liquid wastes.

The inlet and outlet water sources from the main stream are shown in Table 6, together with their corresponding disposition, and Table 7 quantifies them on a 22 ton EAF/day basis. It is observed that the daily fresh water consumption amounts to 17 tons, i.e. only 0.77 ton of water/ton EAF.

TABLE 6

Inlet and outlet water sources from the main stream of soda solution, and their fate

| Inlet water Sources | Destiny of inlet water |
|---|---|
| Water in EAF (3.5% moist basis) | It is evaporated and recovered in the evaporating crystallizer |
| Water in recirculated soda solution | It is evaporated and recovered in the evaporating crystallizer |
| Water for washing of gangue cake | A 41% is recovered in the evaporating crystallizer and it is recycled as pure water, the rest is reused in the circuit of cake washing. |
| Water for washing of Pb cement cake | It is reutilized in the circuit of cake washing. |
| Water for washing of Zn powder | It is reutilized in the circuit of cake washing. | cake

| Outlet water Sources | Destiny of outlet water |
|---|---|
| Water in washed gangue cement | It is evaporated without recovery. |
| Water in washed Pb | It is evaporated without recovery. |
| Water in washed Zn | It is evaporated, condensed and recycled. |
| Evaporated water to generate the purge | It is evaporated, condensed and recycled. |
| Water in the purge | It is evaporated without recovery. |
| Water for washing of floor and equipment | 10% is lost by evaporation, the rest is evaporated, condensed and recycled. |
| Cooling water | A 2% is lost in the cooling tower |
| Vapor from steam boiler | A 2% is lost as condensate |

TABLE 7

Daily water balance (22 ton EAF/day basis)

| | Water Balance, t/day | | |
|---|---|---|---|
| | in | out | recirculate |
| Water in EAF | 0.8 | | |
| Water in lixiviation solutions, recirculated | 104.9 | | 104.9 |
| Water in reposition soln. of soda 32% | 3.1 | | |
| Washing water recuperated in evaporator as 32% soda soln., recycled | 2.5 | | 2.5 |
| Washing water for filtration cakes, recovered by evaporation, recirculated | 14.4 | | 14.4 |
| Washing water for filtration cakes, recycled in washing circuit | 23.7 | | 23.7 |
| Washing water for filtration cakes, lost by evaporation (2%) | | 0.5 | |
| Condensate lost in Evaporator-Crystallizer (2%) | | 0.3 | |
| Water evaporated to obtain the purge, recycled | 5.8 | | 5.8 |
| Water eliminated with the purge | | 0.1 | |
| Water lost by hydroxides formed in the gangue | | 0.5 | |
| Water evaporated from the gangue (lost) | | 3.4 | |
| Water evaporated from Pb Cement (lost) | | 0.4 | |
| Water evaporated from Zn powder, recirculated | 0.7 | | 0.7 |
| Washing water for floor and equipment, treated and recycled | 2.0 | | 2.0 |
| Washing water for floor and equipment, lost by evaporation | | 0.2 | |
| Cooling water, recirculated | 730.0 | | 730.0 |
| Cooling water lost by evaporation (2%) | | 14.6 | |
| Steam, recycled | 42.2 | | 42.2 |
| Steam, lost (2%) | | 0.8 | |
| SUBTOTAL | 929.9 | 20.8 | 926.0 |
| fresh water consumption | 17.0 | | |
| Balance | 946.9 | 946.9 | |

Next, is shown the effectiveness regarding the emissions of particulate matter in the process, on a 22 ton EAF/day processing basis.

The unitary operations of the alkaline process that emit particulate matter were classified in 10 stages, shown in Table 8, together with the corresponding factors of emission (a) and the emissions of particulate matter (b), with and without mitigation.

The main conclusions regarding emissions of particulate matter are the following:

The emissions of particulate matter with mitigation measures show that these emissions do not exceed 1 kg/day and 0.25 ton/year, being no significant emissions therefore. The particulate matter emission calculations for the plant operations were made without considering mitigation measures to obtain a superior and maximum level of the emissions.

In each point of emission of particulate matter, mitigation measures may be implemented to diminish the emission. These measures of mitigation are water sprays and dust collectors with efficiencies of about 90%.

The dust storage may be a closed warehouse with sprays and natural ventilation. After this type of mitigation, it is possible to reach more than about 75% emission reduction The process stages are considered to be installed in shed type buildings with natural ventilation, 10 m height and with a surface of 6,100 m² for the basic case exemplified.

The calculations of emissions using emission factors have an implicit error that varies between about 2 and about 10%, depending on the degree of accuracy with which they were generated.

Next, the alkaline fog emissions are estimated taking into account all the sources, without considering mitigation measures, to obtain a superior and maximum level of the emissions that would take place in the plant operations. Table 9 summarizes the calculations for the estimations of the fog emissions. The fog concept refers to the evaporation of the solutions in the processes of leaching, purification and electrowinning.

Fog emissions in the process of electrowinning in EMEW cells are null because it is a closed process. The solution treated in this stage is recirculated to the leaching stage, and therefore the fog emissions evolve only in the stages of leaching and cementation. The estimation of the fog emissions was made considering the following assumptions:

The alkaline solution and the mixture evaporated from it are considered in equilibrium at the process temperature.

For calculation effects, the fog is considered as an ideal gas.

It was considered a natural ventilation of 0.2 m/s (0.72 km/h, a typical value in closed work), in absence of forced ventilation.

A relative humidity of 50% and a room temperature of 25° C. in the plant building was considered.

Table 10 shows that the total level of fog emissions during the operation of the alkaline stages is 0.00044 [mg/m$^3$]. The total amount of evaporated NaOH is 0.596 mg/day. Therefore, the norm of Environmental Hygiene is not exceeded.

Having described the invention in detail, as it is possible to be appreciated, diverse changes and modifications can be carried out while keeping within the spirit of the disclosure. The totality of those changes and modifications is considered included within the scope of the disclosure as it is defined in the annexed claims.

TABLE 8

Emission of particulate matter in the process (22 ton EAF/day basis)

(a) Emission Factors

| Opn. | Emission Factor | Units | Observations |
|---|---|---|---|
| | | | Dry Area |
| 1 | 0.0017 | kg/Mg | From unloaded material (AP42 C11S12) |
| | | | Assimilated to raw material discharge in cement manufacture |
| 2 | 0.00056 {(U/2.2)$^{1.3}$/(M/2)$^{1.4}$} | g/ton | From unloaded material (AP42 C13S2-4) |
| | | | U = 0.75 m/s$^a$, M = 5%$^b$ |
| | | | U = average speed in the zone |
| | | | M = Moisture content of the stockpile |
| 3 | K * (sL/2)^0.65 * (W/3)^1.5 − C + | g/KTV | Assimilated to emissions of vehicles on paved road and with fine material load (AP42 C13S2-2) |
| | 0.053 | kg/Mg | Grams/Kilometer Moving Vehicle |
| | | | K = size particle factor, 4.6 for PM10 |
| | | | sL = load of fines in carpet, calculated as amount of fine material discharged on the warehouse floor of the processing unit operations, Circulation Area: 200 m$^2$, 0.823 g/m$^{2d}$ |
| | | | W = average weight of vehicles, 0.8 ton$^c$ |
| | | | C = Emission Factor due to traffic, brake and tire wear, 0.2119 |
| | | | Assimilated to material transport in a pile loader (FIRE 6.24 SCC 3-05-025-06, modified by unit conversion factor). |
| 4 | 0.0017 | kg/Mg | From unloaded material (AP42 C11S12) |
| | | | Assimilated to raw material discharge in cement manufacture. |
| 5 | 0.0075 | kg/Mg | From milling material (AP42 C11S19-2) |
| | | | Assimilated to fine milling of the process of milling in the industry of barren. |
| 6 | 0.03 | kg/Mg | From processing material. Assimilated to Processing of metallic mineral ores (AP42 C11S24). Material loading and moving. |
| 7 | 0.03 | kg/Mg | From processing material. Assimilated to Processing of metallic mineral ores (AP42 C11S24). Material loading and moving. |
| 8 | 0.03 | kg/Mg | From processing material. Assimilated to Processing of metallic mineral ores (AP42 C11S24). Material loading and moving. |
| | | | Wet Area |
| 9 | 0.03 | kg/Mg | From processing material. Assimilated to Processing of metallic mineral ores (AP42 C11S24). Material loading and moving. |
| | | | Electrowinning |
| 10 | 0.14 | kg/Mg | From product packaging |
| | | | Assimilated to Coal Production (AP42 C6S1, FIRE 6.24 SCC |

TABLE 8-continued

Emission of particulate matter in the process (22 ton EAF/day basis)

3-01-005-08, modified by factor of conversion of units). End product packaging.

[a]Average annual speed,
[b]Data given in description of the process,
[c]It has been considered that the mini pile loader weight 450 kg and load 250 kg,
[d]Value calculated by considering all the processes in the dry area of the plant, a displacement area of 200 m$^2$, Load of fine = 2.1
*emissions of particulate matter in the process.

(b) Emissions of particulate matter

| Opn. | Emission Factor | | Units | Rate Activity | Units | Emission* | With mitigation Efficiency | Emission to the atmosphere* |
|---|---|---|---|---|---|---|---|---|
| 1 | 0.0017 | | kg/ton | 542 | ton/mo. | 0.92 | 25 | 0.69 |
| 2 | 0.0242 | | kg/ton | 542 | ton/mo. | 13.12 | 75 | 3.28 |
| 3 | 0.1824 | 0.053 g/VKT | kg/ton | 216.8 | km/mo. ton/mo. | 39.58 | 90 | 3.958 |
| 4 | 0.0017 | | kg/ton | 542 | ton/mo. | 0.92 | 90 | 0.092 |
| 5 | 0.0075 | | kg/ton | 542 | ton/mo. | 4.07 | 70 | 1.221 |
| 6 | 0.03 | | kg/ton | 542 | ton/mo. | 16.26 | 90 | 1.626 |
| 7 | 0.03 | | kg/ton | 542 | ton/mo. | 16.26 | 90 | 1.626 |
| 8 | 0.03 | | kg/ton | 542 | ton/mo. | 16.26 | 90 | 1.626 |
| 9 | 0.03 | | kg/ton | | 12.93 ton/mo. | 0.39 | 70 | 0.117 |
| 10 | 0.14 | | kg/ton | | 85.76 ton/mo. | 12.01 | 90 | 1.201 |
| Total emissions of particulate matter | | | | | | 119.79 | | 15.437 |

* kg/mo.

| Dry Area Operations | | Wet Area Operation | |
|---|---|---|---|
| 1 | EAF discharge | 6 | Transport in closed dray to storage silo |
| 2 | Dust storage in bulk | 7 | Dust unloading in storage silo |
| 3 | Transport to Crusher (Frontal loader) | 8 | Transport of particulate matter to leaching reactor |
| 4 | Dust unloading to Crusher | 9 | Purification, fine zinc powder unloading Electrowinning |
| 5 | Crusher (tertiary milling) | 10 | Packaging of powder final product |

TABLE 9

Summary of calculations for the estimation of alkaline fog emissions

| Component | Mixture Temperature [C.] | Vapor Pressure of component [KPa] | Molecular Weight [g/mol] | Concentration [g/l] | N° Moles [moles] | Molar Fraction in the mixture [mol] | Partial Vapor Pressure [KPa] | Mixture Vapor Pressure [KPa] |
|---|---|---|---|---|---|---|---|---|
| LIXIVIATION | | | | | | | | |
| NaOH | 80 | 1.E−07 | 39.997 | 430 | 10.751 | 0.195 | 1.95E−08 | 38.098 |
| Water | 80 | 47.3428 | 18.015 | 798.1 | 44.303 | 0.805 | 38.098 | |
| CEMENTATION | | | | | | | | |
| NaOH | 60 | 1.5E−08 | 39.997 | 430 | 10.751 | 0.802 | 1.20E−08 | 3.9345 |
| Water | 60 | 19.917 | 18.015 | 47.7 | 2.647 | 0.198 | 3.934480 | |

| Component | Heat of vaporization [KJ/kg] | Molar Fraction in the Vapor Phase | Latent Heat of the mixture [KJ/kg] | Molar Fraction in the evaporation [mol/m$^3$] | Concentration in Vapor [g/m$^3$] | Vapor Density [g/m$^3$] |
|---|---|---|---|---|---|---|
| LIXIVIATION | | | | | | |
| NaOH | 209.2151 | 5.126E−10 | 2259.749 | 6.654E−09 | 2.66E−07 | 233.87 |
| Water | 2259.7484 | 0.9999995 | | 12.981908 | 233.873 | |
| CEMENTATION | | | | | | |
| NaOH | 209.2151 | 3.059E−09 | 2259.749 | 4.348E−09 | 1.74E−07 | 25.603 |
| Water | 2259.7484 | 0.9999969 | | 1.4211716 | 25.6028 | |

TABLE 10

Alkaline Fog emission

|  | Lixiviation | Cementation | Units |
|---|---|---|---|
| ESTIMATION OF TOTAL FOG EVAPORATION | | | |
| Processing Time | 60 | 60 | [min] |
| Total area of interchange | 84.82 | 21.21 | [m$^2$] |
| Mass evaporation of Mixture | 477.69 | 7.70 | [Kg/day] |
| Volumetric evaporation of Mixture | 2042.47 | 300.73 | [m3/day] |
| FOG CONCENTRATIONS | | | |
| Concentration of emission of NaOH | 0.000266 | 0.000174 | [mg/m$^3$] |
| Concentration of water emission | 233.87 | 25.60 | [g/m$^3$] |
| ☐ Evaporated mixture | 233.87 | 25.60 | [g/m$^3$] |
| Evaporation of NaOH | 0.5436 | 0.0523 | [mg/day] |

The following publications and the subject matter therein are incorporated herein by reference:

1) Frenay, J., S. Ferlay and J. Hissel (1986) Zinc and Lead Recovery from EAF Dusts by Caustic Soda Process. 44$^{th}$ Electric Furnace Conference Proceedings, Iron and Steel Society of the AIME, Warrendale, Pa., USA. pp. 417-421.

2) Wheatley, B. I. (1990) Production of Zinc Powder from Arc and Smelter Flue Dusts. In: Recycling of Metalliferous Materials, IMM, London. pp. 291-299.

3) Dreisinger, D.B., E. Peters and Morgan, G. (1989) Hydrometallurgical Treatment Options for Carbon Steel Electric Arc Furnace Dusts, In: M.H.I. Baird and S. Vijayan (editors), Proceedings of 2$^{nd}$ International Conference on Separations Science and Technology, Canadian Society for Chemical Engineering, Ottawa, Canada, pp. 578-585.

4) Xia, D.K. and C.A. Pickles (2000) Microwave Caustic Leaching of Electric Arc Furnace Dust. Department of Materials and Metallurgical Engineering, Queen's University. *Minerals Engineering* 13(1), 79-84.

5) Department of Chemical Engineering, Universidad de Santiago de Chile.

6) Bourdeau, K. (1994) Update on Regulations and Enforcement. Proc. of the CMP Electric Furnace Dust Treatment Symposium (Pittsburgh, Pa. EPRI Center for Materials Production).

7) Kola, R. (1991) The Treatment of EAF-Dust in Europe. Proceedings: Recycling Lead and Zinc. The Challenge of the 1990's. Rome, Italy, June 11-13, 279-295.

8) QUESTOR ENGINEERING LIMITED (1983) Caustic Leaching-Electrowinning Process for Treating Electric Arc Furnace Baghouse Dust, Final Report, Queen's University Micromedia, Req. No. 1-9092, July 5, pp. 7-12.

9) Aota, J., S. A.Mikhail, D. T. Liang and W. N. Howell (1994) Low Temperature EAF Dust Vitrification Process, CANMET Mineral Science Laboratories, 33$^{rd}$ Conference of Metallurgists, Aug. 20-25, Toronto, Canada.

10) Center for Materials Production (1993) Electric Arc Furnace Dust-1993 OveMew, CMP Report No. 93-1, (prepared by) Arthur D. Little, Inc. for Center for Materials Production, Pittsburgh, USA.

11) Zunkel, D. (1996) What to do with your EAF Dust. *Steel Times International*, July, 46-50.

12) Moser, W. S., G. T. Mahler, T. R. Kneooer, R. M. Kuba and J. E. Pusateri (1991) Metals Recycling from Steelmaking and Foundry Waste by Horsehead Resource Development.

13) Nyirenda, RL. (1991) The Processing of Steelmaking Flue Dust: A Review. *Minerals Engineering* 4(7-11), 1003-1025.

14) Xia, D.K. (1997) *Recovery of Zinc from Zinc ferrite and Electric Arc Furnace Dust*. Thesis Department of Materials and Metallurgical Engineering. Queen's University. Kingston, Ontario, Canada pp. 1-23.

15) Palencia, I.; R. Romero, N. Iglesias and F. Carranza (1999) Recycling EAF Dust Leaching Residue to the Furnace: A Simulation Study. *JOM*, August 1999.

16) Merril, C.C. and R.S. Lang (1995) *Experimental Caustic Leaching of Oxidized Zinc Ores and Minerals and the Recovery of Zinc from Leach Solution*. Report of Investigations 6576, Bureau of Mines, United States Department of the Interior.

17) Youcai, Z. and R. Stanforth (2000) Integrated hydrometallurgical process for production of Zinc from electric arc furnace dust in alkaline medium. *Journal of Hazardous Materials* 80, 223-240.

18) CA-A-12000701

19) Chukhlantscv, V.G. (1956), The Solubility Product of Metal Arsenates, *Zhur. Neorg. Khim.*, I: 1975-82, II: 529-35; *Zhur. Anal. Khim.* 11, 529-35; *J. Anal. Chem.* 11, 565-71.

The invention claimed is:

1. An electro-hydrometallurgical process that extracts zinc from electric arc furnace dust to produce zinc of high purity and fine particle size, comprising:
   leaching electric arc furnace dust with an alkaline solution to form a zincates solution;
   separating the zincates solution into a liquid portion and a gangue portion;
   inertizing the gangue portion;
   purifying the liquid portion by cementation and separating precipitated solids from the liquid portion;
   purifying the liquid portion by adsorption, wherein the liquid portion is submitted to adsorption by percolation with Ba(OH)$_2$ to substantially eliminate arsenic and is substantially continuously percolated on a fixed bed of Ba(OH)$_2$ operating in countercurrent or crosscurrent stages and having an adsorption capacity, with a load of Ba(OH)$_2$ between about 3 and about 10 times over a stoichiometric amount required for adsorption according to the chemical reaction As$_2$O$_5$+2Ba(OH)$_2$(s)→ 2BaHAsO$_4$(s)+H$_2$O and once the adsorption capacity of the bed is exhausted, the bed is removed, dried and disposed of in a waste disposal site;
   at least partially evaporating a resulting purified solution to form a concentrated solution;
   bleeding at least a fraction of the concentrated solution;
   crystallizing at least a fraction of the concentrated solution;
   electro-depositing zinc from the concentrated solution; and
   separating, washing and drying deposited Zn.

2. The process according to claim 1, further comprising crystallizing by evaporation the concentrated solution in a multiple-effect evaporator to obtain crystallized salts that are eliminated.

3. The process according to claim 1, wherein moisture content of the electric arc furnace dust is maintained between about 5 and about 10% prior to leaching.

4. The process according to claim 1, wherein the alkaline solution is concentrated in a multiple-effect evaporator to about a soda concentration of 32% and is recirculated to a leaching stage, wherein water is recovered and reused in washing.

5. The process according to claim 1, further comprising washing the gangue portion in one or more stages, in a countercurrent or crosscurrent operation, with between about 3 and about 10 successive washing loads, wherein the first 2 to 5 washing loads comprise a solution of about 200 to about 400 g/L of NaOH and the last washing loads comprise water and the washing load volume is on the order of about one to three volumes of the solids to wash.

6. The process according to claim 1, wherein the concentrated solution is submitted to electro-deposition in a substantially cylindrical cell, to avoid generation of an alkaline fog.

7. The process according to claim 1, wherein a filter press is used to effect solid-liquid separation of electrodeposited zinc to obtain a zinc cake.

* * * * *